(No Model.) 2 Sheets—Sheet 1.

A. LINDGREN.
WHEEL PLOW.

No. 323,169. Patented July 28, 1885.

WITNESSES
Sidney P. Hollingsworth
William H. Shipley

INVENTOR
August Lindgren
By Phil. T. Dodge
Attorney

N. PETERS, Photo-Lithographer, Washington, D. C.

(No Model.) 2 Sheets—Sheet 2.

A. LINDGREN.
WHEEL PLOW.

No. 323,169. Patented July 28, 1885.

WITNESSES
Sidney P. Hollingsworth
William H. Shipley

INVENTOR
August Lindgren
By Phil. T. Dodge.
Attorney

UNITED STATES PATENT OFFICE.

AUGUST LINDGREN, OF MOLINE, ILLINOIS, ASSIGNOR TO THE MOLINE PLOW COMPANY, OF SAME PLACE.

WHEEL-PLOW.

SPECIFICATION forming part of Letters Patent No. 323,169, dated July 28, 1885.

Application filed January 12, 1885. (No model.)

*To all whom it may concern:*

Be it known that I, AUGUST LINDGREN, of Moline, in the county of Rock Island and State of Illinois, have invented certain Improvements in Wheeled Plows, of which the following is a specification.

My invention relates to that class of machines in which a mold-board plow is secured adjustably to a carrying-frame mounted on three wheels, two of which travel in the furrows, while the third passes over the unplowed land.

The principal aims of the present improvements are to adapt the plow to be turned conveniently and in a small space, to permit a lateral adjustment of the forward steering-wheel, that it may travel in the middle or at the vertical side of the furrow, as the condition of the soil may demand, and to permit a convenient adjustment of the land-wheel and yielding action of the same as it passes over obstructions.

Figure 1:
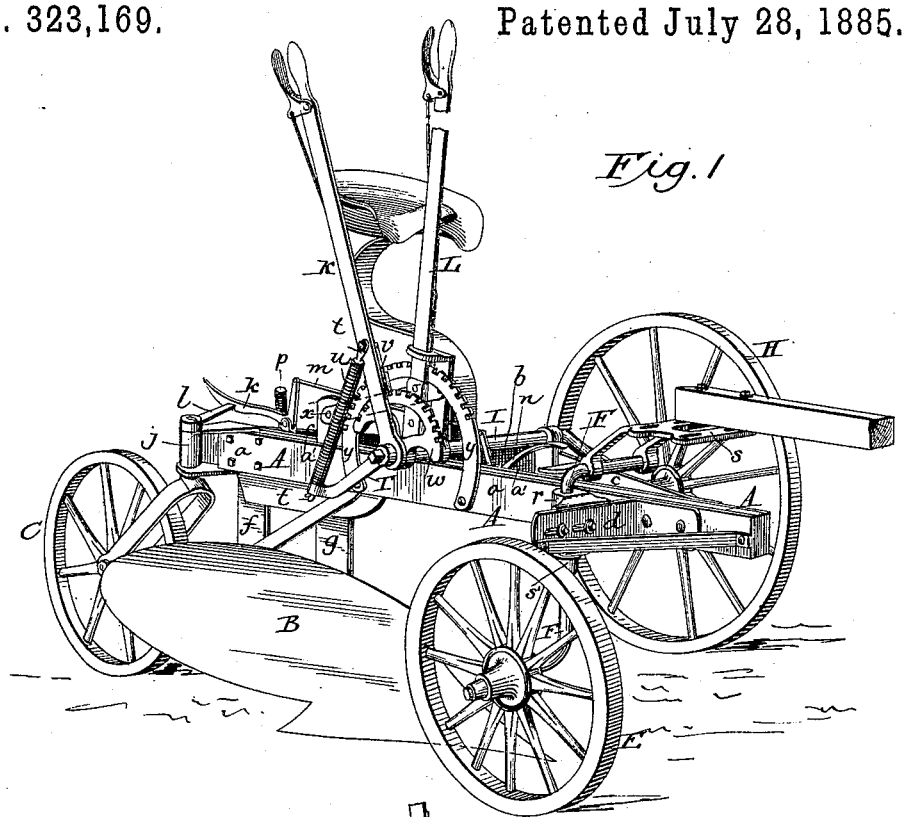
Figure 2:
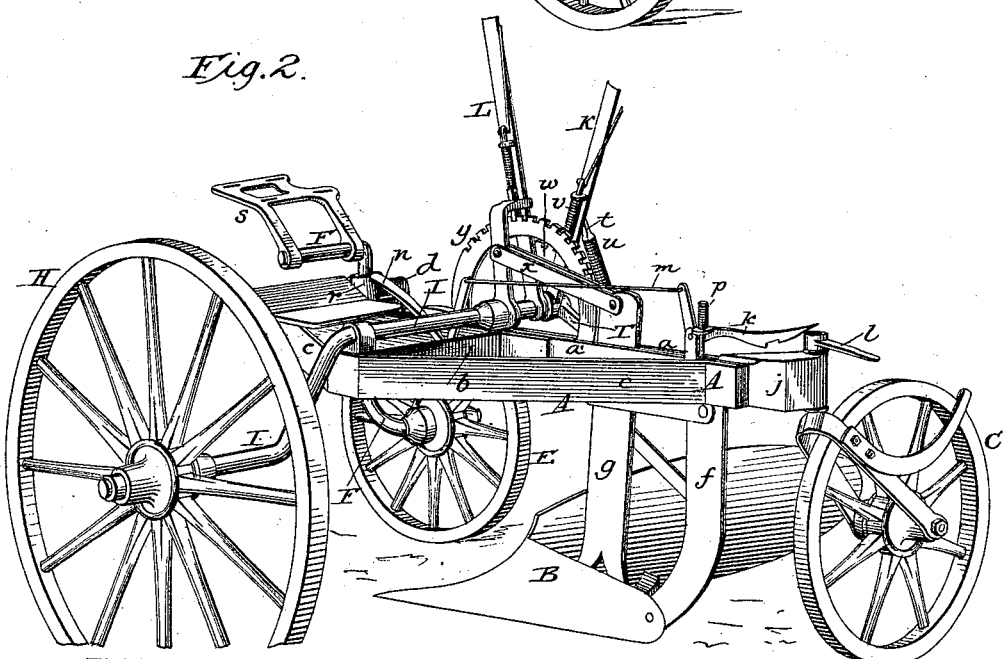
Figure 3:
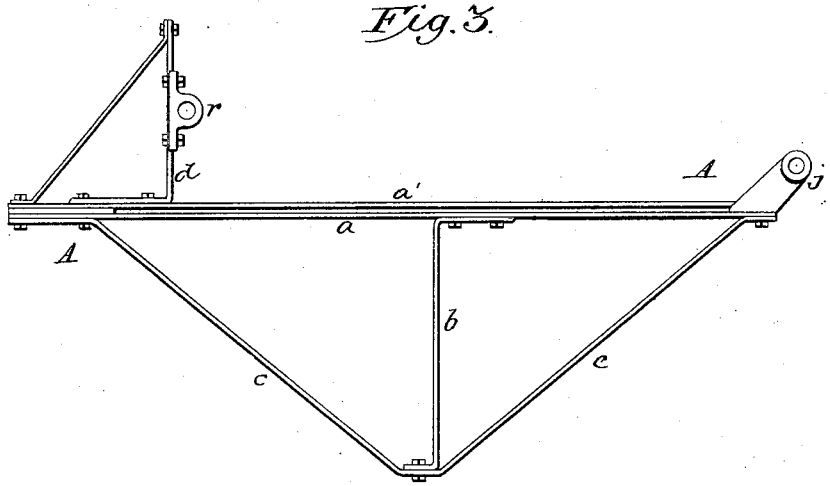
Figure 4:
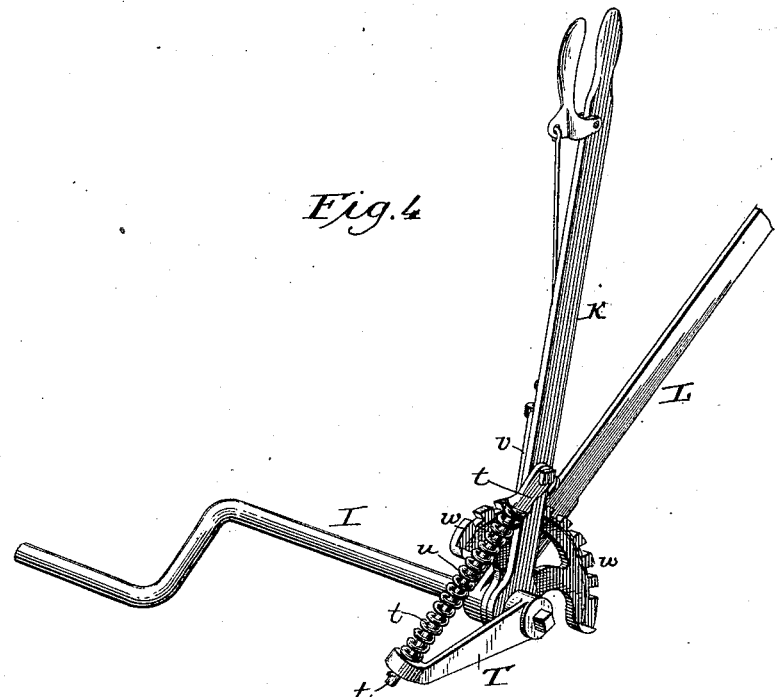

In the accompanying drawings, Figure 1 represents a perspective view of the plow from the furrow side, the various parts being in position for action; Fig. 2, a perspective view of the same from the opposite side, with the rear wheel unlocked and in the position which it assumes in turning the plow; Fig. 3, a top plan view of the main frame or beam and certain of its attachments; Fig. 4, a perspective view of the land-wheel axle and the parts for controlling the same.

Referring to the drawings, A represents the main frame or beam designed to carry the plow, the driver's seat, and the devices for adjusting the plow and controlling the wheels. It is preferably constructed in the form and manner represented in the drawings, but may be modified provided it is adapted to receive the various parts hereinafter described.

As represented in the drawings, the frame is in the form of a triangle, and consists of two longitudinal bars, $a$ $a'$, slightly separated to leave a vertical space or slot between them; an arm, $b$, extending rigidly from the bar $a$ at right angles thereto to receive the bearings of the land-wheel axle; an angular bar or brace, $c$, extending from the two ends of the bar $a$ to the outer end of the arm $b$, and a forward arm, $d$, extending outward at right angles on the furrow side and braced by a bar, $e$, to carry the bearing of the leading-wheel.

The various members of the frame are usually of wrought-iron, and are bolted, riveted, or otherwise united firmly to one another. Near the rear end the frame has a rigid depending arm, $f$, to the lower end of which there is pivoted the heel of a mold-board plow, B. At its front this plow has the usual standard, $g$, rising rigidly therefrom between the bars $a$ $a'$, and serving as a means by which the point of the plow may be thrown upward or downward, as required. The rear end of the frame is sustained by a trailing caster-wheel, C, so placed as to travel in the new furrow immediately behind the plow B. The fork or arm in which this wheel is mounted has a vertical journal seated in a bearing-block, $j$, which is bolted to the rear end of the main frame.

In order that the steering of the machinery may be properly controlled, and that it may work on hillsides and be safely backed, I provide for locking the caster-wheel fork rigidly in position with the wheel in line with the line of travel, but unlocking the same at will, in order that the wheel may swing or swivel when turning the machine at the end of the field. I propose to use for this purpose locking devices of any suitable form.

As shown in the drawings, the locking device consists of a latch, $k$, pivoted to the frame, and arranged to engage an arm, $l$, fixed on the journal of the caster-fork. The latch is beveled on its under face in such manner that it will engage automatically when the wheel assumes its normal position. A rod or like connection, $m$, is extended from the rear upturned end of the latch to a foot-lever, $n$, mounted on the main frame adjacent to the driver's seat, so that the driver may release the rear wheel at will without the use of his hands. A spring, $p$, mounted on a vertical rod, may be applied, as in the drawings, to insure the action and prevent disengagement of the latch. At its forward end the frame is carried by the steering-wheel E, arranged to travel ahead of the plow in the preceding furrow. The wheel is mounted on the horizontal end of an axle, F, the middle portion of which rises vertically through a box or bearing, $r$, in which it turns, allowing the wheel a swiveling motion to the right and left, that it may stand oblique to the line of the beam. The upper end of the axle is extended horizontally toward the land and forms a journal to receive the plate $s$, to which the tongue or draft-pole is firmly secured. The plate is free to turn vertically around the end of the axle as the front of the tongue rises and falls; but when the tongue swings laterally, following the direction of the draft, the plate turns the axle and wheel to correspond. The plate is slotted, as shown, so that the tongue may be adjusted with an inclination to the right or left of the plane of the wheel, and thus the wheel caused to run to or from the land. The box or bearing is bolted firmly to the arm $d$ of the main frame; but the arm is slotted horizontally, as shown, so that the bearing may be adjusted transversely of the machine, in order to carry the wheel against the land side of the furrow or in the middle of the same. When the land is in favorable condition, the wheel is adjusted to travel close to the vertical side of the old furrow, in which position it serves to gage accurately the width of the new furrow; but when the ground is wet and soft, the wheel is moved away from the furrow side to prevent it from gathering trash and mud.

I recommend the construction of the axle F from a single bar of round iron bent into form, as shown; but it may be otherwise constructed. When thus made it is provided with a collar, $s'$, pinned thereon below the box or bearing to carry the weight of the frame. At the land side the frame is supported by the wheel H, traveling on the unplowed ground, and mounted on the cranked end of a transverse axle, I, mounted in boxes or bearings bolted to the cross arm or bar $b$ of the main frame or beam, so that by turning the axle the wheel may be raised or lowered in relation to the frame. The inner end of this axle is squared to receive a crank-arm, T, which is fixed rigidly thereon. Loosely on the axle there is mounted a hand-lever, K, provided with a rod, $t$, which extends loosely through the crank T, and is surrounded by a spring, $u$, which serves as a yielding or elastic connection between the lever and crank, so that when the lever is thrown backward it compresses the spring, which in turn depresses the crank and turns the axle I so as to depress the land-wheel. The hand-lever is provided with a locking-dog, $v$, engaging a rack-plate, $w$, attached to a second lever, L, as hereinafter described. The yielding action of the spring permits the land-wheel to yield and ride easily over obstructions and across furrows without materially affecting the action of the plow.

For the purpose of adjusting the plow proper, and also the axle-adjusting lever K, I mount loosely around the axle I a hand-lever, L, connected to the plow-standard by links $x$, and provided with a locking-dog to engage a rack-plate, $y$. By these devices the point of the plow may be tipped upward and downward and secured at any point desired. The movement of the main lever L has the effect of simultaneously raising the plow and lowering the land-wheel, and vice versa. The independent adjustment of the lever K raises or lowers the wheel without directly affecting the plow.

It will be observed that the land-wheel is located about midway of the length of the machine, between the two furrow-wheels, and opposite the point or apex of the frame. This arrangement is highly advantageous in that it permits the machine to be turned in a small space, in corners, and in close proximity to fences.

Having thus described my invention, what I claim is—

1. In a wheeled plow, the combination, with the main frame, of the land-wheel, its axle provided with the two cranks, the hand-lever and its locking devices, and the spring interposed between the crank and lever, as shown.

2. The wheel and its axle provided with cranks at opposite ends, in combination with the hand-lever mounted loosely around the axle, the devices for locking the lever, the rod connecting the lever and crank, and the spiral spring.

3. In a wheeled plow, the combination of the following members: a frame or beam having a mold-board plow secured thereto, a land-wheel, a swiveling leading-wheel connected to and guided by the draft-pole and arranged to travel in the furrow in advance of the plow, a rear caster-wheel to travel in the new furrow behind the plow, and a locking device, substantially as shown, whereby the operator may lock and unlock the rear wheel at will.

4. In a wheeled plowing-machine provided with a mold-board plow, two swiveling furrow-wheels, one in advance and the other in rear of the plow, the forward wheel attached to and guided by the draft devices, and the rear wheel combined with devices, substantially such as described, by which it may be locked during the plowing action, but unlocked when turning the machine.

5. In a wheeled plow, the triangular main frame having the mold-board plow attached, in combination with the swiveling leading-wheel, the swiveled rear wheel, and the land-wheel located at the apex of the frame between the front and rear wheels, as described, whereby the turning of the machine in a small space is permitted.

6. In a wheeled plowing-machine having a main frame and a mold-board plow attached thereto, a non-swiveling wheel to travel on the unplowed ground, a swiveling leading-wheel attached to and guided by the tongue and pole, and a swiveled trailing-wheel provided with locking devices, said parts combined and arranged for joint operation as described.

7. The main frame having the slotted arm $d$, in combination with the leading-wheel, the axle having the vertical portion, and the axle box or bearing connected to the slotted arm by bolts.

8. In a wheel-plow, the combination of the main frame provided with a vertical box or bearing, $r$, the wheel E, the tongue-connection, and the axle F, having the vertical middle portion arranged to turn in the bearing $r$, and the two horizontal ends extended in opposite directions, one of said ends carrying the wheel, and the other secured to the tongue-connection, substantially as described and shown.

In testimony whereof I hereunto set my hand, this 12th day of December, 1884, in the presence of two attesting witnesses.

AUGUST LINDGREN.

Witnesses:
W. V. RICHARDS,
A. R. BRYANT.